2,990,392
Patented June 27, 1961

2,990,392
RESINOUS COMPOSITION COMPRISING AN ACRYLONITRILE POLYMER AND AN ALKYL BIS(CYANOETHYL)AMINO PROPIONATE ESTER
Robert Saxon, Stamford, and Mary T. Burgess, Greenwich, Conn., assignors to American Cyanamid Company, New York, N.Y., a corporation of Maine
No Drawing. Filed Aug. 7, 1958, Ser. No. 753,651
7 Claims. (Cl. 260—31.2)

The present invention relates to improved copolymeric compositions containing an average of at least 60% by weight of combined acrylonitrile. More specifically, the present invention relates to the plasticization of polymers containing at least 60% acrylonitrile with compounds comprising the reaction products of an iminobispropionitrile and certain unsaturated acid esters in order to improve the flexural properties of these polymers for the production of useful articles of manufacture.

Polyacrylonitrile has various properties which make it a highly desirable material in the field of plastics generally. It is highly resistant to common organic solvents; it is chemically inert; it has a high softening point, and it can be prepared easily by conventional free radical polymerization techniques. Some of the qualities of polyacrylonitrile, however, heretofore have been considered drawbacks to broader usage of this polymer. The high softening point, which favors dimensional stability of a finished article manufactured therefrom, makes unmodified polyacrylonitrile almost impossible to mold by the usual compression or injection methods. Exceptionally high temperatures are required, leading to discoloration, which is generally undesirable in the product. The chemical inertness which imparts solvent resistance in acrylonitrile polymers is due to strong inter-chain hydrogen bonding, but at the same time, this property leads to extreme rigidity, brittleness and low impact and flexural strength in products produced therefrom. Accordingly, polymers containing predominant amounts of combined acrylonitrile have been generally unsuitable for various applications, such as in the manufacture of molded articles and as a film-forming composition, largely due to the poor flowing properties of this polymer and because of the brittle character of finished product. Plasticizers heretofore incorporated with polymers containing a predominance of combined acrylonitrile in order to improve the flexural properties of these polymers have not been satisfactory, mainly because of the significant incompatibility of the plasticizing compound resulting in a gradual migration of the plasticizer to the surface with consequent brittleness and often discoloration, or because the plasticizer is water soluble and is consequently leached from the polymeric article upon contact with water, also resulting in brittleness. The present invention avoids such such shortcomings and provides an improved plasticized polyacrylonitrile composition having excellent flexural properties and in which the plasticizer is water insoluble and fully compatible with the polymer.

It is an object of the present invention to provide a polymeric composition containing a preponderance of combined acrylonitrile which has improved product flexibility by incorporating into the polymer as a plasticizer a reaction product of an iminobispropionitrile and an ester selected from the group consisting of alkyl acrylates and alkyl methacrylates, in which the alkyl group contains 1 to 10 carbon atoms. Other objects and advantages will become apparent hereinafter as the description of the invention proceeds.

The principal requirements for a plasticizer are: compatibility, i.e. freedom from subsequent separation or exudation when blended with the polymer; solvency, i.e. ability of the plasticizer to soften the polymer; permanence, i.e. the plasticizer must be non-volatile, chemically stable and resistant to leaching by water or other solvents under service conditions, and the plasticizer should be non-toxic.

The present invention is based upon the discovery that homopolymers and copolymers of acrylonitrile, specifically copolymers containing in their molecules an average of at least 60% by weight of combined acrylonitrile are compatible with water-insoluble iminobispropionitrile unsaturated acid ester reaction products. Compounds of this type which have been found useful are those obtained by reacting an iminobispropionitrile and esters of unsaturated aliphatic acids, which acids contain a double bond between carbon atoms 2 and 3, said esters containing not over 13 carbon atoms in the acid and alcohol portions combined. The compounds as employed in our invention are contemplated as permanent plasticizers which are permitted to remain in the shaped homopolymer or copolymer to provide continuing flexibility in the article of manufacture.

A suitable illustrative procedure for the preparation of the plasticizers of the type employed in the present invention is described below. However, these compounds as such and their means of preparation, apart from their use herein described and claimed, form no part of the present invention.

PREPARATION OF ETHYL 3-[BIS(CYANOETHYL)-AMINO]PROPIONATE

A mixture of 38 parts of 3,3'-iminobispropionitrile, 28 parts of ethyl acrylate, and 2 parts of 3 M HCl is heated under reflux for 12 hours and distilled. A portion of the reactants is recovered unchanged, after which 17.4 parts of ethyl 3-[bis(cyanoethyl)amino]propionate, boiling at 165–180° at 1 mm. (appreciably higher than any reactant) is collected as a distillate. The nitrogen analysis of the product is 18.93%; as calculated theoretically, $$C_{11}H_{17}O_2N_3$$

contains 18.84% nitrogen.

PREPARATION OF BUTYL 3-[BIS(CYANOETHYL)-AMINO]PROPIONATE

The foregoing procedure is carried out with the substitution of 36 parts of butyl acrylate for the 28 parts of ethyl acrylate. Volatile materials are removed by heating the reaction mixture to 170° at 1 mm. pressure, and the desired product remains as a pot residue comprising a rather viscous amber oil. This product, butyl 3-[bis(cyanoethyl)amino]propionate, distills with partial decomposition at 175–194° at 1 mm. pressure.

The preparation of other plasticizers of an iminobispropionitrile and an ester of acrylic or methacrylic acid may be accomplished via the same procedure using like amounts of iminobispropionitrile and other esters. Suitable bis(cyanoethyl)aminoalkyl esters within the contemplation of the invention include methyl 3-[bis(2-cyanoethyl)amino]propionate, ethyl 3-[bis(2-cyanoethyl)amino]propionate, propyl 3-[bis(2-cyanoethyl)amino]propionate, butyl 3-[bis(2-cyanoethyl)amino]propionate, 2-ethylhexyl 3-[bis(2-cyanoethyl)amino]propionate, methyl 3-[bis(2-cyanoethyl)amino]-2-methylpropionate, ethyl 3-[bis(2 - cyanoethyl)amino] - 2 - methylpropionate, propyl 3-[bis(2-cyanoethyl)amino]-2-methylpropionate, butyl 3-[bis(2-cyanoethyl)amino]-2-methylpropionate, 2-ethylhexyl 3-[bis(2-cyanoethyl)amino]-2-methylpropionate, and the like.

Homopolymeric acrylonitrile and acrylonitrile copolymers containing in the polymer molecules an average of at least 60% by weight of combined acrylonitrile are employed in carrying the present invention into effect. In a preferred embodiment, the invention contemplates copolymers of acrylonitrile containing from 60% to about 90% acrylonitrile and from 40% to about 10% of a different copolymerizable monomer having a $CH_2=C<$ group. These polymers and copolymers are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 60% by weight of combined acrylonitrile. The expression "polymerization product containing in the polymer molecules an average of at least 60% by weight of combined acrylonitrile," as used herein, means a polymerization product (polymer, copolymer or interpolymer or mixtures thereof) containing in its molecules an average of at least 60% by weight of the acrylonitrile unit

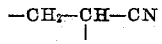

or, otherwise stated, at least 60% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 60% by weight of combined acrylonitrile are compounds containing a single $CH_2=C<$ grouping, for instance, the vinyl esters and especially the vinyl esters of saturated aliphatic monocarboxylic acids, e.g. vinyl acetate, vinyl propionate, vinyl butyrate, etc.; vinyl and vinylidene halides, e.g. the vinyl and vinylidene chlorides, bromides and fluorides; acrylic and alkacrylic acids, e.g. methacrylic, ethacrylic, etc., and esters and amides of such acids, e.g. methyl, ethyl, propyl, butyl, etc., acrylates and methacrylates, acrylamide, methacrylamide, N-methyl, -ethyl, -propyl, -butyl, etc. acrylamides and methacrylamides, etc.; methacrylonitrile, ethacrylonitrile and other hydrocarbon-substituted acrylonitriles; vinyl aromatic monomers, e.g. styrene, the methyl styrenes, e.g. ortho-, meta- and para-methyl styrene, dimethyl styrene, as well as halogenated styrene, such as chloro- and bromo-styrenes, methyl styrenes and the like; unsaturated aliphatic hydrocarbons containing a single $CH_2=C<$ grouping, e.g. isobutylene, etc.; and numerous other vinyl, acrylic and other compounds containing a single $CH_2=C<$ grouping which are copolymerizable with acrylonitrile to yield thermoplastic copolymers.

The proportions of monomers in the polymerizable mixture may be varied as desired or as may be required in order to obtain a polymerization product containing in the polymer molecules an average of at least 60% by weight of combined acrylonitrile. Thus, when the polymerization rate of the monomers present in the polymerizable mixture is substantially the same, the proportions may be, for example, from, by weight, about 60% to about 100% of acrylonitrile to from about 40% to none of the other comonomer. When the polymerizable mixture contains, in addition to the acrylonitrile a monomer such, for example, as vinyl chloride, vinyl acetate, isobutylene, etc., which polymerizes at a rate different from that of acrylonitrile, then it may be necessary to subject to polymerization conditions a mixture in which acrylonitrile constitutes as little as, for instance, 50% by weight thereof in order to obtain a polymerization product containing in the copolymer molecules an average of at least 60% by weight of acrylonitrile. For example, in the copolymerization of acrylonitrile and isobutylene, a monomer charge in the ratio of acrylonitrile to isobutylene of about 50:50 is generally required to obtain a copolymer having a combined ratio of 70:30, respectively.

Any suitable method of polymerizing the monomeric acrylonitrile or mixture of monomers may be employed. One suitable method comprises polymerizing the monomer or mixture of monomers in an aqueous emulsion using a suitable polymerization catalyst such as ammonium persulfate, for example. Other polymerization methods, however, also may be used, such as those described in Bauer et al. U.S. Patents Nos. 2,160,054 and 2,436,929, for example. The polymeric and copolymeric acrylonitriles used in practicing our invention may be of any suitable molecular weight, but ordinarily the molecular weight (average molecular weight) is within the range of 40,000 to 1,000,000 or higher, and advantageously is of the order of 50,000 to 750,000 as calculated from a viscosity measurement of the polymer in dimethyl formamide using the well known Staudinger equation which is referred to in U.S. Patent No. 2,404,713.

Incorporation of the platicizers in the acrylonitrile polymer may be conducted by any suitable procedure, such as by blending on a two-roll mill or by use of a Banbury mixer, for example. The blending time may be shortened by using a comminuted polymer. To minimize the possibility of discoloration, it is generally advisable to employ blending temperatures as low as is consistent with practical considerations, although temperatures up to 170° C. and even higher may be employed with certain polymers and mixing cycles. The proportions of the acrylonitrile polymerization product and the ester plasticizer in the composition of our invention may be varied widely, depending mainly on the properties desired in the particular use for which the composition is intended. In the preparation of a film, for example, from which substantially all of the compound as a solvent, such as dimethyl formamide, is employed, amounts of as little as 5%, based on the weight of the combined acrylonitrile in the polymer, may be sufficient. On the other hand, amounts of 100% and even greater quantities of the plasticizer based on the weight of combined acrylonitrile may be usefully employed.

The plasticized compositions of the invention may not only be molded into useful articles of manufacture by procedures well known by those with ordinary skill in the art, but as noted hereinabove the plasticized acrylonitrile polymerization product may be cast in the form of the films. For example, a dimethyl formamide soluton of the acrylonitrile polymer may be cast upon a revolving drum which is partly immersed in a coagulating bath of, for example, water, cold benzene, etc., which will extract the dimethyl formamide and serve to deposit the acrylonitrile polymerization product as a thin film on the drum as it passes through the bath. The resulting film may be stretched, if desired, lengthwise and crosswide by suitable apparatus to improve its properties. Alternatively, solutions of the acrylonitrile polymer with tris(cyanoethyl) esters may be evaporated in a gaseous atmosphere to form films which may be similarly stretched to improve their properties.

Compositions comprising the plasticizers hereinbefore described with polymer comprising at least 60% combined acrylonitrile may also be employed as a dielectric or in the manufacture of components for electrical applications. The plasticized composition can also be combined with paper, fabrics and other dielectrics.

In order that those skilled in the art may better understand how the invention may be practiced, the following examples are given by way of illustration and are not to be construed as a limitation of the invention. In the examples, all parts are parts by weight unless noted otherwise.

*Example 1*

One part of the reaction product of 3,3'-iminobispropionitrile with ethyl acrylate and 2 parts of an acrylonitrile-isobutylene copolymer (analyzing 78% acrylonitrile and 22% isobutylene) are stirred with 20 parts of methanol, and the alcohol removed by warming it on the steam bath. The resulting plasticized polymer is compression molded into a bar which has good impact strength and flexing properties. A similar bar prepared with the plasticizer omitted is brittle as well as rigid.

Example 2

A film was cast from a solution of:

(a) 2 parts of the acrylonitrile-isobutylene resin of Example 1.
(b) 1 part of the 3,3′-iminobispropionitrile-ethyl acrylate reaction product of Example 1.
(c) 30 parts of dimethyl formamide.

On air drying overnight, this film is rubbery and withstands severe flexing. A corresponding film with component (b) omitted is stiff and brittle and frangible upon flexing.

Example 3

Butyl acrylate is substituted for ethyl acrylate in making a reaction product as described in Examples 1 and 2. Both the film and the bar made from this reaction product and the resin of Example 1 are soft and flexible.

Example 4

The procedure of Example 1 is substantially duplicated with the exception that an equal amount of an acrylonitrile-methylstyrene copolymer (75:25) is employed in place of the acrylonitrile-isobutylene copolymer of that example. The product has significantly improved impact strength and flexing properties over the non-plasticized copolymer.

Example 5

A mixture of 48 parts of a 73/27 acrylonitrile/isobutylene copolymer and 24 parts of butyl 3-[bis(2-cyanoethyl)amine]propionate is fluxed on heated rolls for about 5 minutes to yield a soft, flexible sheet. This was molded into a flat shape, about 0.078 inch thick, in a suitable heated press. Samples were cut from the resulting sheet for testing by conventional rubber testing procedures. The ultimate elongation was 350% when measured according to ASTM test D–638–56T, and the brittle temperature was −26° C. when measured according to ASTM test D–736–54T. A smilar sheet made from unplasticized resin is so stiff as to have no appreciable elongation, and has a brittle temperature above room temperature.

From the foregoing description, it will be seen that the present invention provides compositions comprising an acrylonitrile polymerization product and a plasticizer. These compositions can be shaped or fabricated, as by extrusion, molding, casting, etc., into a wide variety of useful articles. Lubricants, antistatic agents and other conventional modifiers of acrylonitrile polymerization products can be incorporated therein at any suitable stage of the operation.

While the invention has been described with reference to various specific compounds and examples, it will be understood that the invention is not limited to these illustrative examples, but is to be limited only by the scope of the claims which follow.

We claim:

1. A synthetic resinous composition comprising (1) a polymerization product selected from the group consisting of homopolymers of acrylonitrile and copolymers of acrylonitrile with a monoethylenically unsaturated monomer copolymerizable therewith, wherein said copolymer contains at least 60% by weight of interpolymerized acrylonitrile, plasticized with (2) an ester selected from the group consisting of alkyl 3-bis(cyanoethyl)amino propionates and alkyl 3-bis(cyanoethyl)amino-2-methyl propionates, wherein the alkyl group contains 1 to 10 carbon atoms.

2. A synthetic resinous composition comprising (1) a copolymer of 60 to about 90 weight percent of acrylonitrile and from 40 to about 10 weight percent of monoethylenically unsaturated monomer copolymerizable therewith, plasticized with (2) an ester selected from the group consisting of alkyl 3-bis(cyanoethyl)amino propionates and alkyl 3-bis(cyanoethyl)amino-2-methyl propionates, wherein the alkyl group contains 1 to 10 carbon atoms.

3. A synthetic resinous composition comprising (1) a copolymer of from 60 to about 90 weight percent of acrylonitrile and from 40 to about 10 weight percent of a monoethylenically unsaturated monomer copolymerizable therewith and (2) ethyl 3-[bis(cyanoethyl)amino] propionate.

4. A synethic resinous composition comprising (1) a copolymer of from 60 to about 90 weight percent of acrylonitrile and from 40 to about 10 weight percent of a monoethylenically unsaturated monomer copolymerizable therewith and (2) butyl 3-[bis(cyanoethyl)amino]-propionate.

5. A synthetic resinous composition comprising (1) a copolymer of from 60 to about 90 weight percent of acrylonitrile and from 40 to about 10 weight percent isobutylene and (2) ethyl 3-[bis(cyanoethyl)amino)propionate.

6. A synthetic resinous composition comprising (1) a copolymer of from 60 to about 90 weight percent of acrylonitrile and from 40 to about 10 weight percent isobutylene and (2) butyl 3-[bis(cyanoethyl)amino]propionate.

7. A synthetic resinous composition comprising (1) a copolymer of from 60 to about 90 weight percent of acrylonitrile and from 40 to about 10 weight percent methylstyrene and (2) ethyl 3-[bis(cyanoethyl)amino]-propionate.

No references cited.